(12) United States Patent
Takaya et al.

(10) Patent No.: US 8,274,346 B2
(45) Date of Patent: Sep. 25, 2012

(54) ELECTROMAGNETIC CONTACT DEVICE

(75) Inventors: Kouetsu Takaya, Kounosu (JP); Koji Okubo, Kumagaya (JP); Yasuhiro Naka, Kounosu (JP); Toshikatsu Ohgami, Kumagaya (JP); Kenji Suzuki, Saitama (JP)

(73) Assignee: Fuji Electric FA Components & Systems Co., Ltd., Tokyo (JP)

( * ) Notice: Subject to any disclaimer, the term of this patent is extended or adjusted under 35 U.S.C. 154(b) by 0 days.

(21) Appl. No.: 13/138,485

(22) PCT Filed: Jun. 2, 2010

(86) PCT No.: PCT/JP2010/059379
§ 371 (c)(1),
(2), (4) Date: Oct. 7, 2011

(87) PCT Pub. No.: WO2011/021423
PCT Pub. Date: Feb. 24, 2011

(65) Prior Publication Data
US 2012/0056701 A1 Mar. 8, 2012

(30) Foreign Application Priority Data

Aug. 20, 2009 (JP) ................................. 2009-190567

(51) Int. Cl.
*H01H 3/00* (2006.01)
(52) U.S. Cl. ............ 335/189; 335/78; 335/86; 335/127; 335/131; 335/132; 335/185; 335/190; 335/202
(58) Field of Classification Search ............... 335/78–86, 335/127, 185–195, 202, 129–135
See application file for complete search history.

(56) References Cited

U.S. PATENT DOCUMENTS

| 3,671,891 | A | * | 6/1972 | Usui et al. | 335/126 |
| 4,490,701 | A | * | 12/1984 | Dietrich et al. | 335/78 |
| 4,800,352 | A | * | 1/1989 | Haury et al. | 335/132 |
| 4,922,216 | A | * | 5/1990 | Dietrich | 335/128 |
| 4,947,146 | A | * | 8/1990 | Ichimura et al. | 335/131 |
| 5,075,660 | A | * | 12/1991 | Ootsuka | 335/131 |
| 2009/0243769 | A1 | * | 10/2009 | Takaya et al. | 335/127 |

FOREIGN PATENT DOCUMENTS

| GB | 2229039 A | * | 9/1990 |
| JP | H64-048339 | | 2/1989 |
| JP | H04-006723 | | 1/1992 |
| JP | 2001222940 A | * | 8/2001 |

* cited by examiner

*Primary Examiner* — Mohamad Musleh
(74) *Attorney, Agent, or Firm* — Manabu Kanesaka

(57) ABSTRACT

An electromagnetic contact device has a contactor holder (40), which moves a mounted movable contactor (42*a*) according to a displacement of a movable core (32) forming an electromagnet (30) for operation. The contactor holder (40) is being housed together with the electromagnet (30) for operation in a case (1). The case (1) has a lower case portion (10) housing the electromagnet (30) for operation and an upper case portion (20) engaging with the lower case portion (10) while being stacked on the lower case portion and houses the contactor holder (40) advanced from above. The upper case portion (20) has a recess (21) with an upward opening and houses the contactor holder (40) placed on the bottom wall of the recess (21). The lower case portion (10) houses one selected either a DC-only electromagnet (30*b*) or an AC-only electromagnet (30*a*).

7 Claims, 4 Drawing Sheets

ELECTROMAGNETIC CONTACT DEVICE

RELATED APPLICATIONS

The present application is National Phase of International Application No. PCT/JP2010/059379 filed Jun. 2, 2010, and claims priority from, Japanese Application No. 2009-190567 filed Aug. 20, 2009.

TECHNICAL FIELD

The present invention relates to an electromagnetic contact device, and more specifically, relates to an electromagnetic contact device having a contactor holder which moves a mounted movable contactor according to displacement of a movable core forming an electromagnet, and which is housed together with the electromagnet in a contact device body.

BACKGROUND ART

In the prior art, electromagnetic contact devices comprising a contactor holder which moves a mounted movable contactor according to displacement of a movable core comprised by an electromagnet for operation, and which is housed in a contact device body together with the electromagnet for operation, are known in which the contact device body of the electromagnetic contact device, that is, the case forming the outer contour of the electromagnetic contact device, comprises a lower case portion and an upper case portion.

The lower case portion is provided to house the electromagnet for operation. The upper case portion is positioned to be engaged with the lower case portion while stacked on the lower case portion, and houses the contactor holder in a state of guidance and support while enabling sliding motion in the left-right direction. And, such an upper case portion generally houses the contactor holder in a state of insertion from the lower (see for example Patent Reference 1).

Patent Reference 1: Japanese Patent Laid-open No. S64-48339

However, in an electromagnetic contact device such as described above, because the upper case constructed by the case that is the contact device body houses the contactor holder in a state of insertion from the lower, there have been the following problems.

When an electromagnetic contact device is assembled, an electromagnet for operation is inserted into a lower case portion from above, and by this means the lower case portion houses the magnet for operation in a state of insertion from above. Thereafter, an upper case portion is engaged with the lower case portion so as to be stacked on the lower case portion accommodating the electromagnet for operation in a state of insertion from above; but because the upper case portion houses a contactor holder in a state of insertion from the lower, the upper case portion is temporarily inverted and put into an inverted orientation, the contactor holder is advanced and caused to be housed, and after again inverting, the upper case portion is caused to be engaged with the lower case portion. That is, in assembly of the electromagnetic contact device, a process of inverting the upper case portion is necessary, and consequently the assembly process is complex.

DISCLOSURE OF THE INVENTION

In light of the above circumstances, the object of this invention is to provide an electromagnetic contact device which could improve the efficiency of the assembly tasks through the collective incorporation of a plurality of constituent components.

In order to attain the above object, the electromagnetic contact device of Claim 1 of the application is an electromagnetic contact device having a contactor holder, which moves a mounted movable contactor according to displacement of a movable core forming an electromagnet, with the contactor holder being housed together with the electromagnet in a contact device body, wherein the contact device body has: a lower case portion which houses the electromagnet, and an upper case portion which engages with the lower case portion while being stacked on the lower case portion and houses the contactor holder advanced for the housing from above.

In claim 2 of the application reciting the electromagnetic contact device of claim 1, the upper case portion of the contact device body has a recess with an upward opening and houses the contactor holder placed on the bottom wall of the recess.

In claim 3 of the application reciting the electromagnetic contact device of claim 1 or 2, the lower case portion of the contact device body houses one selected alternately either a DC-only electromagnet, or an AC-only electromagnet.

In claim 4 of the application reciting the electromagnetic contact device of claim 3, the upper case portion of the contact device body supports, by insertion into a hole therewithin, a lever member which links the movable core forming the electromagnet housed in the lower case portion and the contactor holder.

By means of this invention, the upper case portion constructing the contact device body engages with the lower case portion housing the electromagnet by stacking, houses the contactor holder which is advanced from above, so that during an assembly of the electromagnetic contact device, constituent components can be incorporated by drop-in insertion in the order of lower case portion, electromagnet, and upper case portion, and there is no need to invert the upper case portion as in the prior art. Hence by incorporating a plurality of constituent components collectively, there is the advantageous result that the efficiency of assembly tasks can be improved.

BEST MODE FOR CARRYING OUT THE INVENTION

Below, preferred embodiments of an electromagnetic contact device are explained in detail, referring to the attached drawings.

Figure 1:
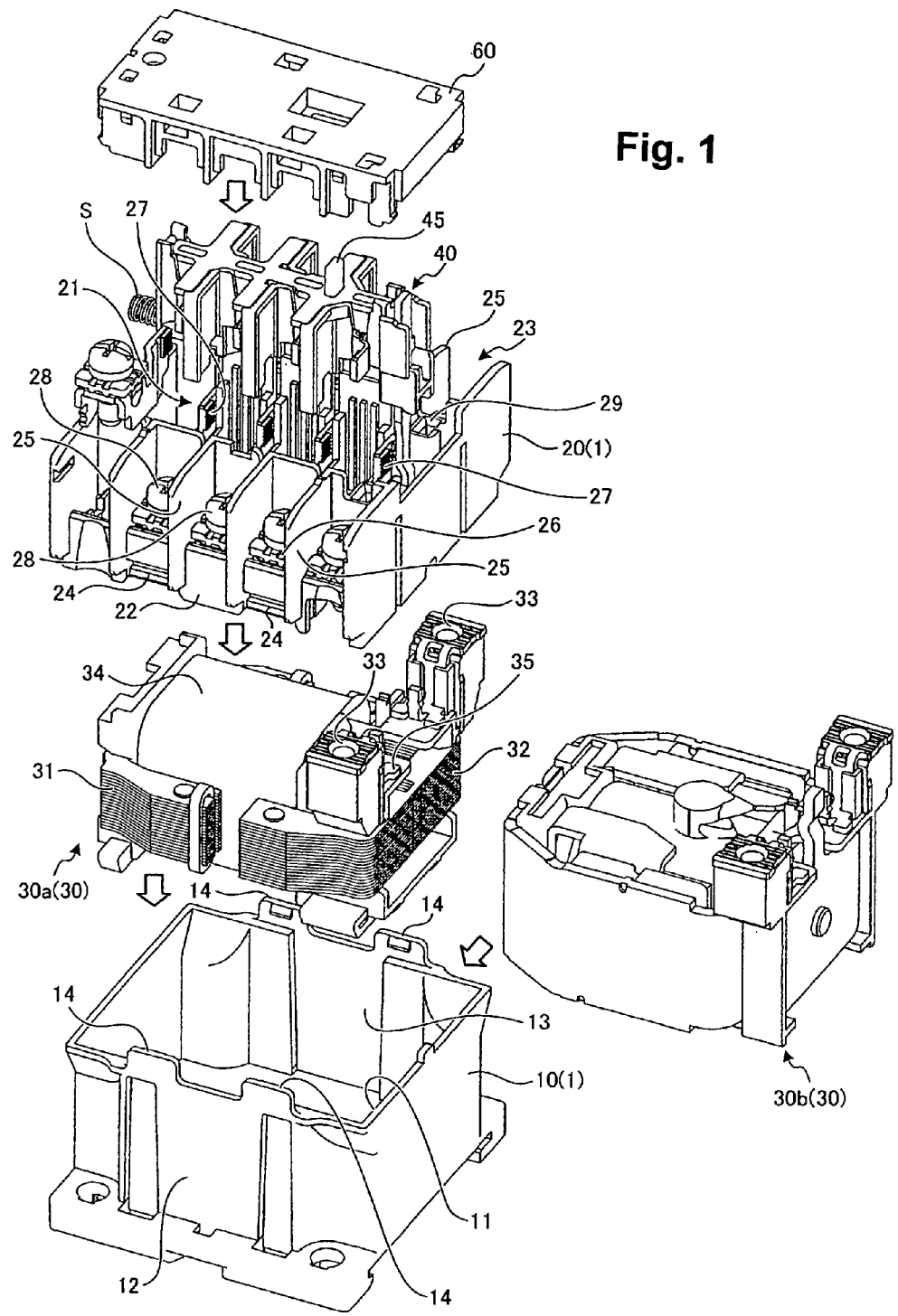
FIG. 1 is an exploded perspective view showing constituent components of an electromagnetic contact device which is the present embodiment.

FIG. 1 is an exploded perspective view showing constituent components of the electromagnetic contact device of a present embodiment. The electromagnetic contact device shown here comprises a case serving as a contact device body, that is, a case 1 forming the outer contour of the device. For example, the case 1 is formed by appropriately shaping a resin material or similar, and comprises a lower case portion 10 and an upper case portion 20.

The lower case portion 10 has a box shape with a bottom, open at the top, and the hollow portion 11 therewithin houses an electromagnet for operation 30. This lower case portion 10 can individually house both an AC-only electromagnet 30a and a DC-only electromagnet 30b as the electromagnets for operation 30, and houses exactly one selected from an AC-only electromagnet 30a and a DC-only electromagnet 30b. At the upper edges of the front wall 12 and rear wall 13 of this lower case portion 10 are provided lower engaging pieces 14, protruding upward, which serve as snap-fit engaging means for engagement with the upper case portion 20. The following explanation assumes that the lower case portion 10 houses an AC-only electromagnet 30a as the electromagnet for operation 30.

The electromagnet for operation 30 (AC-only electromagnet 30a) housed in the lower case portion 10 is positioned such that a fixed core 31 and a movable core 32 are horizontally opposed. The symbol 33 in the figure indicates a mounting hole, used to mount a screw terminal (control terminal) drawn out from an electromagnetic coil 34. As is shown explicitly in FIG. 3, an insertion hole 35 for insertion of the tip portion of the operation lever 50 is formed in the movable core 32.

The upper case portion 20 has a recess 21 which opens upward, and on the lower edges of the front wall 22 and rear wall 23 thereof are formed upper engaging pieces 24, protruding downward and which engage with the lower engaging pieces 14, and which together with the lower engaging pieces 14 of the lower case portion 10 serve as snap-fit engaging means. By engaging the upper engaging pieces 24 with the lower engaging pieces 14, the upper case portion 20 is engaged and positioned so as to be stacked on the lower case portion 10.

The contactor holder 40, advanced from above, is placed on the bottom wall of the recess 21 and housed in the recess 21 of the upper case portion 20. That is, the upper case portion 20 houses the contactor holder 40, advanced from above, in a state of placement on the bottom wall of the recess 21.

In the upper case portion 20 are formed partition barriers 25 extending in the front-rear direction according to the arrangement of movable contactors 42a of the contactor holder 40, described in detail below; terminal portions of fixed contactors 27 are drawn out to terminal bases 26 formed between the partition barriers 25, and terminal screws 28 are screwed thereinto.

A hole 29 is formed in the right-edge side of the upper case portion 20. This hole 29 is to enable insertion and support of the operation lever 50 (see FIG. 3) the tip portion of which is inserted into the insertion hole 35 in the movable core 32.

Figure 2:
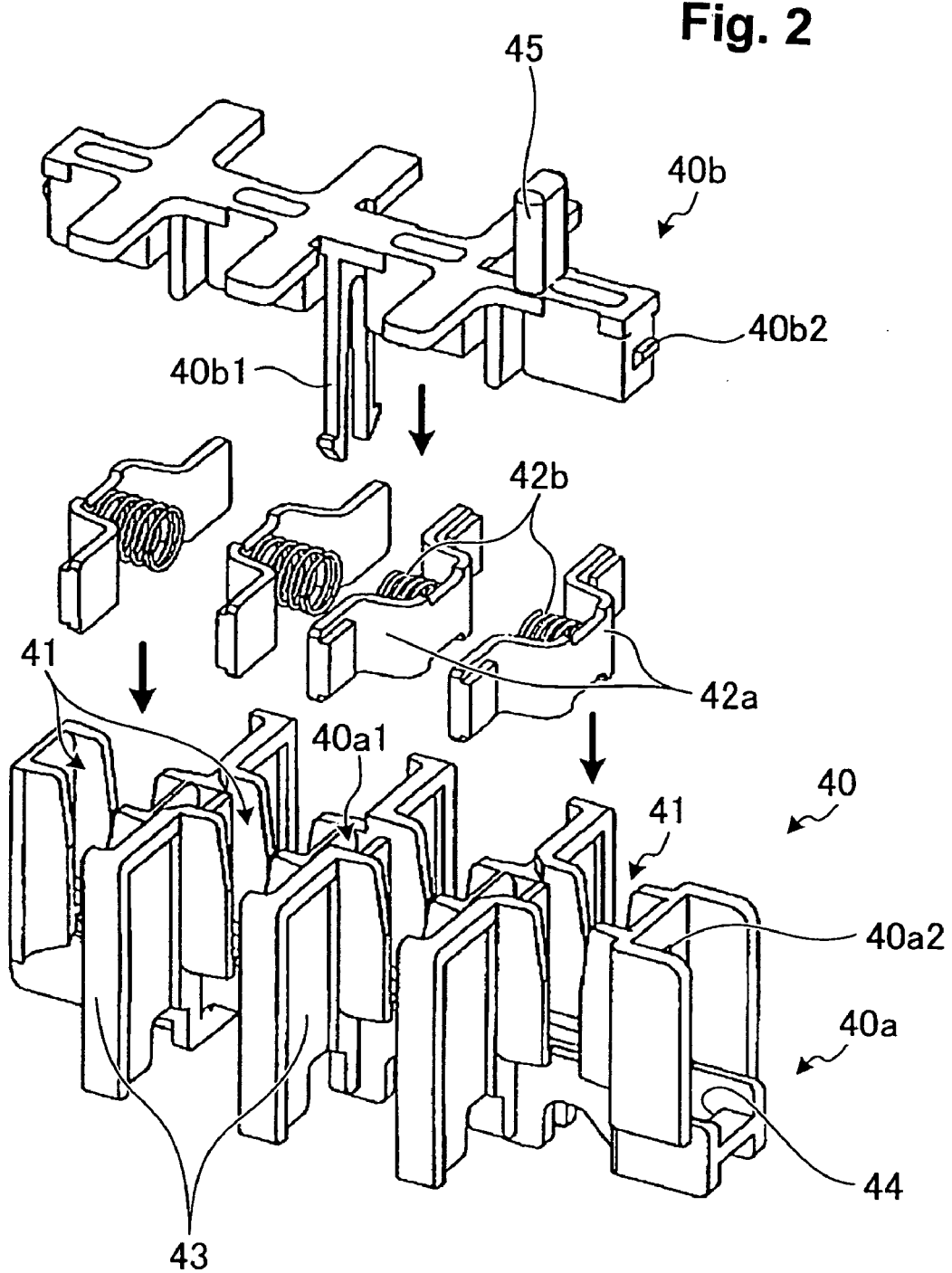
FIG. 2 is an exploded perspective view showing constituent components of a contactor holder housed in the upper case portion shown in FIG. 1.

FIG. 2 is an exploded perspective view showing constituent components of the contactor holder 40 housed in the upper case portion 20. As shown in the figure, the contactor holder 40 housed in the upper case portion 20 is for example formed by appropriately shaping a resin material or similar, and comprises a contactor holder base portion 40a, and a contactor holder cover 40b.

The contactor holder base portion 40a is open at the top, and a plurality of recesses 41 (in the example shown, four) are formed in a horizontal row. Into these recesses 41 are advanced from above and installed a plurality of sets (in the example shown, four) of units in which a movable contactor 42a is combined with a contact spring 42b. Here, among the movable contactors 42a shown, the two sets on the left are "a" contacts, and the two sets on the right are "b" contacts. Also, insulating barriers 43 are formed extending in the front-rear direction between adjacent recesses 41.

Further, a lever insertion hole 44 for insertion of the operation lever 50 is formed in the right-edge portion of the contactor holder base portion 40a.

An engaging piece with a two-prong pawl shape 40b1, which is inserted into a penetrating hole 40a1 provided in the vertical direction in the contactor holder base portion 40a and the tip engaging with the bottom portion, and engaging protrusions 40b2, which engage with engaging holes 40a2 opened in right-left end faces of the contactor holder base portion 40a, are formed in the contactor holder cover 40b as snap-fit engaging means for engagement with the contactor holder base portion 40a in a state of covering the upper face of the contactor holder base portion 40a. The symbol 45 in the figure is a protrusion to display operation of the electromagnetic contact device.

By placing the contactor holder cover 40b onto and pressing into the contactor holder base portion 40a from above in this way, the engaging piece 40b1 of the contactor holder cover 40b penetrates the penetrating hole 40a1 and the pawls at the tip engage with the bottom wall of the contactor holder base portion 40a, and in addition, the engaging protrusions 40b2 of the contactor holder cover 40b advance into and engage with the engaging holes 40a2 provided in both end faces of the contactor holder base portion 40a, so that the contactor holder base portion 40a and the contactor holder cover 40b are mechanically firmly joined to obtain an integral contactor holder 40.

In FIG. 1, the symbol S indicates a return spring (compressed coil spring) of the contactor holder 40, interposed between a side wall of the upper case portion 20 and the left-end face of the contactor holder 40, which presses and urges the contactor holder 40 toward a right-side standby position. At this time, the lever insertion hole 44 of the contactor holder 40, hole 29 of the upper case portion 20, and insertion hole 35 of the movable core 32 of the electromagnet for operation 30 are adjusted so as to be arranged in a straight line in the front-rear direction.

Figure 3:
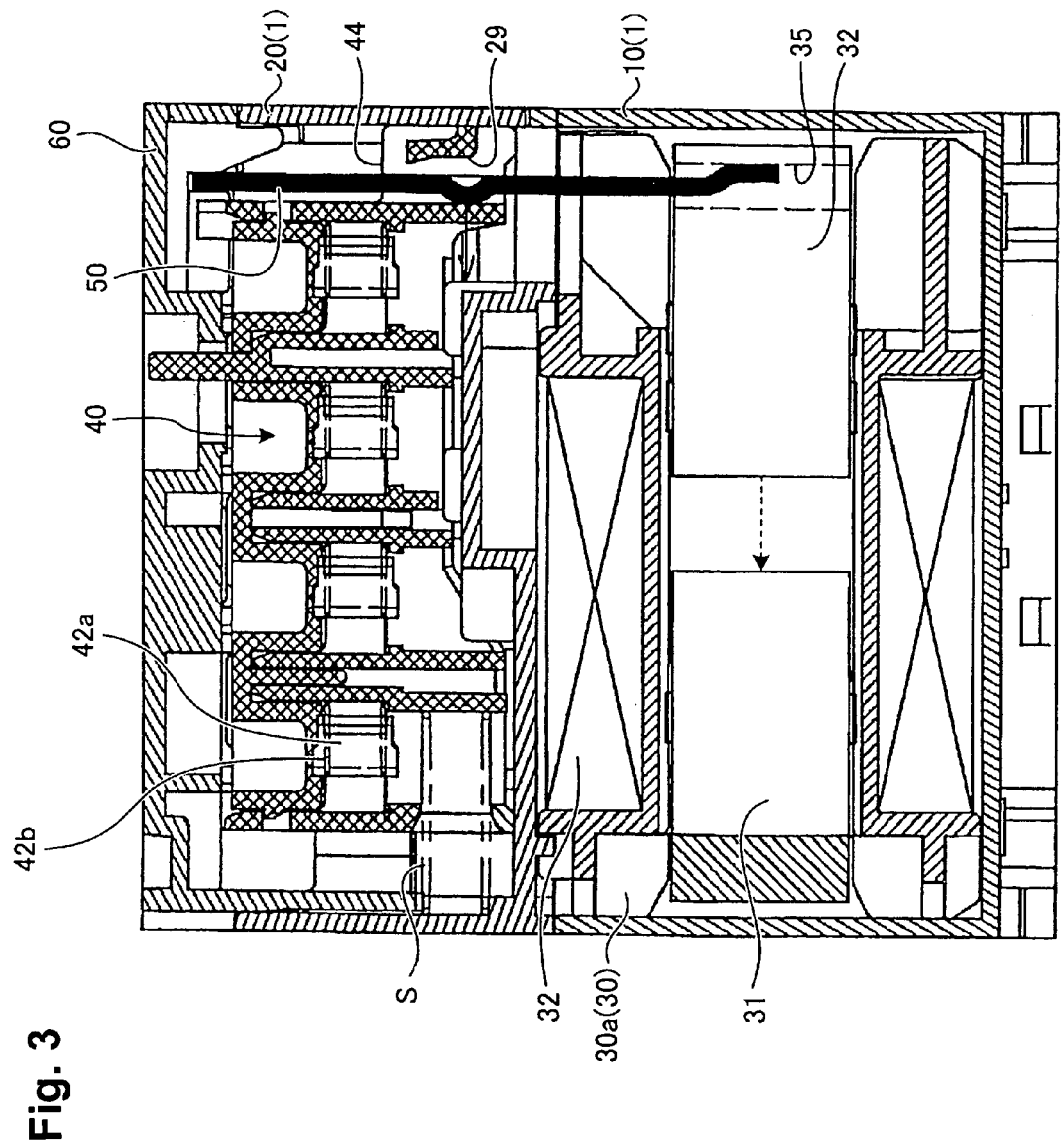
FIG. 3 is a cross-sectional view from the front side showing an example of the electromagnetic contact device of the present embodiment.

And, after the operation lever 50 has been advanced such that the tip is inserted into the insertion hole 35 through the insertion hole 35, hole 29 and lever insertion hole 44 arranged in a straight line, by engaging the cover member 60 with the upper case portion 20 so as to cover the top of the upper case portion 20, the electromagnetic contact device is formed as shown in FIG. 3. Here, FIG. 3 shows an example of an electromagnetic contact device of a present embodiment, and is a cross-sectional view shown from the front side.

If an electromagnetic contact device is configured in this way, as shown in FIG. 3, the contactor holder 40 is urged by the return spring S and is positioned at the standby position on the right side. At this time, those movable contactors 42a of the contactor holder 40 forming "b" contacts are electrically connected with the fixed contactors 27 of the upper case portion and are closed, while those forming "a" contacts are open with respect to the fixed contactors 27 of the upper case portion 20.

From this state, when an external command causes a current to be passed in the electromagnetic coil 34 of the electromagnet for operation 30 to perform excitation, the movable core 32 is attracted to the fixed core 31. That is, in FIG. 3, the movable core 32 is displaced by sliding to the left. Then, the contactor holder 40 linked via the operation lever 50 to the movable core 32 slides and moves to the left in opposition to the urging force of the return spring S, and by this means the movable contactor 42a performs switching action, opening the "b" contacts, and electrically connecting the "a" contacts to the fixed contactors 27 of the upper case portion 20 to perform closing.

However, when a DC-only electromagnet 30b is selected as the electromagnet for operation 30 in FIG. 1, action is as follows. Here the DC-only electromagnet 30b is positioned such that the fixed core 31b and the movable core 32b are left-right opposed, and the operation lever 51 is linked to this movable core 32b.

Figure 4:
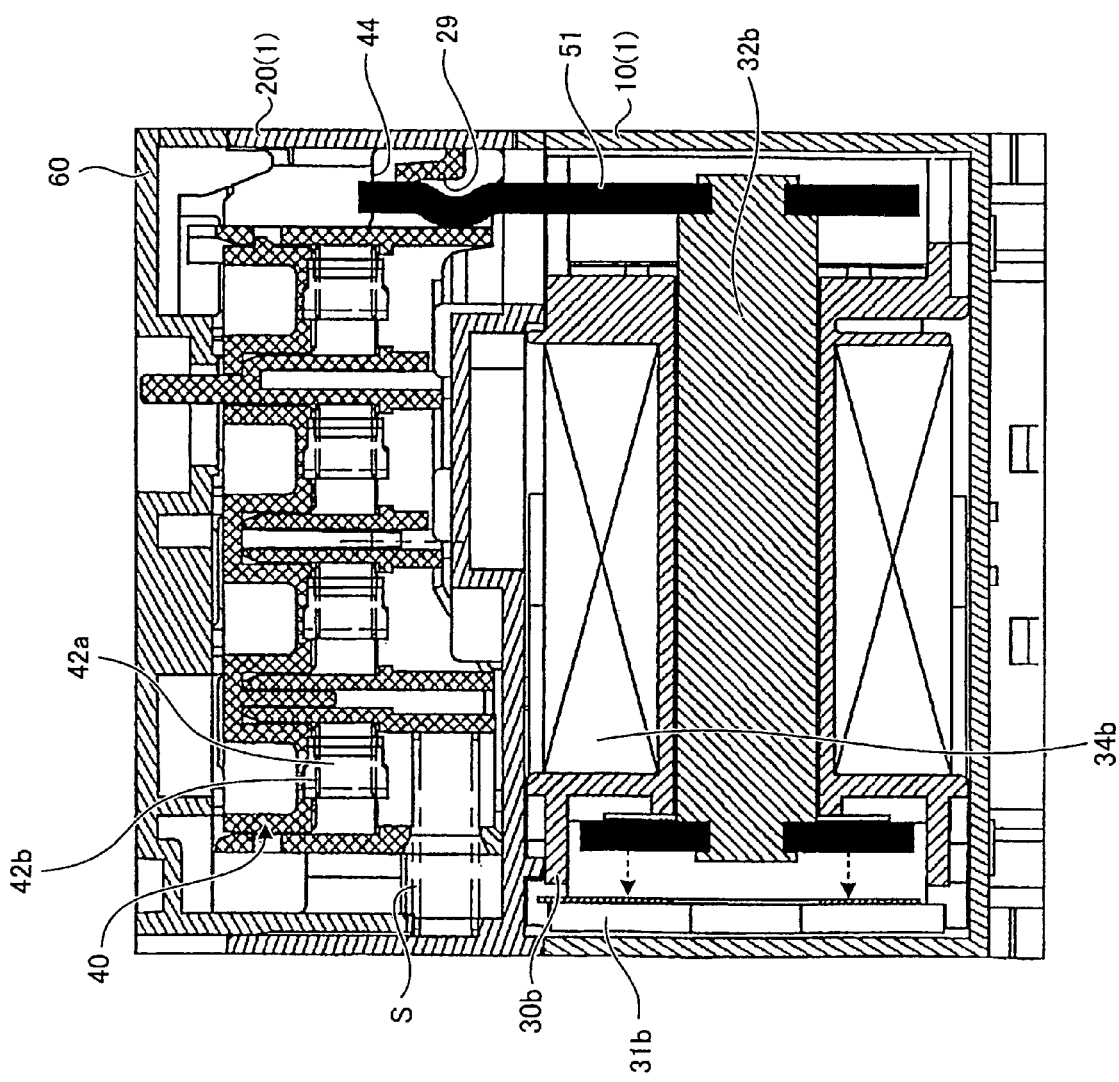
FIG. 4 is a cross-sectional view from the front side showing the configuration of an electromagnetic contact device when the lower case portion of the contact device body houses and selects a DC-only electromagnet as an electromagnet for operation.

With the upper case portion 20 housing the contactor holder 40, which is stacked on the lower case portion 10 housing the DC-only electromagnet 30b in this way, and moreover, with the operation lever 51 passing through the hole 29 and lever insertion hole 44 and engaged, the cover member 60 is then engaged with the upper case portion 20 while covering the top of the upper case portion 20, and by this means the electromagnetic contact device is formed, as shown in FIG. 4. Here, FIG. 4 shows a cross-sectional view from the front side of the configuration of the electromagnetic contact device when a DC-only electromagnet 30b is selected as the electromagnet for operation 30 and housed in the lower case portion 10.

In the electromagnetic contact device configured in this way, as shown in FIG. 4, the contactor holder 40 is urged by the return spring S and is positioned at the standby position on the right side. At this time, those movable contactors 42a of the contactor holder 40 forming "b" contacts are electrically connected with the fixed contactors 27 of the upper case portion and are closed, while those forming "a" contacts are open with respect to the fixed contactors 27 of the upper case portion 20.

From this state, when an external command causes a current to pass through the electromagnetic coil 34b of the electromagnet for operation 30 to perform excitation, the movable core 32b is attracted to the fixed core 31b. That is, in FIG. 4, the movable core 32 is displaced by sliding to the left. Then, the contactor holder 40 linked via the operation lever 51 to the movable core 32b slides and moves to the left in opposition to the urging force of the return spring S, and by this means, the movable contactor 42a performs switching action, opening the "b" contacts, and electrically connecting the "a" contacts to the fixed contactors 27 of the upper case portion 20 to perform closing.

As explained above, by means of the electromagnetic contact device of this embodiment, a case 1 is formed, and moreover, an upper case portion 20 which engages with a lower case portion 10 while stacked thereupon houses a contactor holder 40 which is advanced from above, so that during the assembly of the electromagnetic contact device, constituent components can be incorporated by drop-in insertion in the order of lower case portion 10, electromagnet for operation 30, and upper case portion 20, and there is no need to invert the upper case portion 20 as in the prior art. Hence by incorporating a plurality of constituent components collectively, the efficiency of assembly tasks can be improved.

In particular, the upper case portion 20 supports a lever member linking the movable core 32 comprised by the electromagnet for operation 30 housed by the lower case portion and the contactor holder 40, by insertion into a hole 29 therewithin, so that even if the operation lever 50 is not linked to the electromagnet for operation 30 and the contactor holder 40, during the assembly of the electromagnetic contact device, it is sufficient to insert the operation lever 50 by drop-in insertion, and by this means the efficiency of assembly tasks can be further improved.

Further, by means of the electromagnetic contact device of this embodiment, the lower case portion 10 comprised by the case 1 houses exactly one selected from among an AC-only electromagnet 30a and a DC-only electromagnet 30b as an electromagnet for operation 30, so that the electromagnet for operation 30 need not be only a DC-only electromagnet 30b as in the prior art, and electromagnets for operation 30 can be employed according to various applications.

Explanation of Reference Numerals

1 Case
10 Lower case portion
11 Hollow portion
12 Front wall
13 Rear wall
14 Lower engaging piece
20 Upper case portion
21 Recess
22 Front wall
23 Rear wall
24 Upper engaging piece
25 Partition barrier
26 Terminal base
27 Fixed contactor
28 Terminal screw
29 Hole
30 Electromagnet for operation
30a AC-only electromagnet
30b DC-only electromagnet
31, 31b Fixed core
32, 32b Movable core
33 Mounting hole
34 Electromagnetic coil
35 Insertion hole
40 Contactor holder
40a Contactor holder base portion
40a1 Penetrating hole
40a2 Engaging hole
40b Contactor holder cover
40b1 Engaging piece
40b2 Engaging protrusion
41 Recess
42a Movable contactor
42b Contact spring
43 Insulating barrier
44 Lever insertion hole
45 Protrusion to display operation
50 Operation lever
51 Operation lever
60 Cover member
S Return spring

What is claimed is:

1. An electromagnetic contact device, comprising:
a lower case portion,
an electromagnet housed in the lower case portion and having a movable core with a first insertion hole therein,
an upper case portion engaging with the lower case portion and having a hole at one side thereof,
a contactor holder disposed in the upper case portion slidably according to a displacement of the movable core, said contactor holder having a second insertion hole at one end, and
an elongated operation lever connecting the movable core and the contact holder, said operation lever having a configuration such that the operation lever is inserted in the first insertion hole through the second insertion hole and the hole in the upper case after the upper and lower case portions and contact holder are assembled together, and is directly placed in the first insertion hole of the movable core and is supported by the hole in the upper case.

2. The electromagnetic contact device according to claim 1, wherein the upper case portion of the contact device comprises a recess with an upward opening, and houses the contactor holder while being mounted on a bottom wall of the recess.

3. The electromagnetic contact device according to claim 1, wherein the lower case portion of the contact device houses one selected either a DC-only electromagnet or an AC-only electromagnet.

4. The electromagnetic contact device according to claim 3, wherein the upper case portion of the contact device supports the operation lever linking the movable core forming the electromagnet housed in the lower case portion and the contactor holder by inserting into the hole of the upper case portion.

5. The electromagnetic contact device according to claim 1, further comprising a contact holder cover covering the contact holder, and having a protrusion to display operation of the contact holder and an engaging piece extending downwardly therefrom, said engaging piece entering into a penetrating hole of the contact holder and engaging the contact holder.

6. The electromagnetic contact device according to claim 5, wherein the operation lever is fixed to the movable core and the contact holder so that the contact holder moves in a direction same as that of the movable core when the movable core is operated.

7. The electromagnetic contact device according to claim 6, wherein the upper and lower case portions are arranged such that the electromagnet is disposed in the lower case portion from above, the upper case portion is placed on the lower case portion, the contact holder is disposed in the upper case portion, and the operation lever is assembled with the movable core through the contact holder and the upper case portion.

* * * * *

UNITED STATES PATENT AND TRADEMARK OFFICE
CERTIFICATE OF CORRECTION

PATENT NO. : 8,274,346 B2
APPLICATION NO. : 13/138485
DATED : September 25, 2012
INVENTOR(S) : Kouetsu Takaya et al.

Page 1 of 1

It is certified that error appears in the above-identified patent and that said Letters Patent is hereby corrected as shown below:

Change column 5, line 60 to 61, "the lower case portion and the contactor holder 40," to --the lower case portion 10 and the contactor holder 40,--.

Signed and Sealed this
Twelfth Day of February, 2013

Teresa Stanek Rea
*Acting Director of the United States Patent and Trademark Office*